US008420203B2

(12) United States Patent
Sikora et al.

(10) Patent No.: US 8,420,203 B2
(45) Date of Patent: Apr. 16, 2013

(54) SURFACE STRUCTURE FOR A WORKING DEVICE

(75) Inventors: Bernhard Sikora, Kelkheim (DE); Roland Ullmann, Offenbach (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 13/218,486

(22) Filed: Aug. 26, 2011

(65) Prior Publication Data

US 2011/0311777 A1 Dec. 22, 2011

Related U.S. Application Data

(63) Continuation of application No. PCT/IB2010/051240, filed on Mar. 22, 2010.

(30) Foreign Application Priority Data

Mar. 28, 2009 (DE) ......................... 10 2009 015 432

(51) Int. Cl.

| | |
|---|---|
| ***B32B 3/00*** | (2006.01) |
| ***D06N 7/04*** | (2006.01) |
| ***G11B 5/64*** | (2006.01) |
| ***B62K 21/26*** | (2006.01) |
| ***A63B 41/08*** | (2006.01) |
| ***B25G 1/01*** | (2006.01) |

(52) U.S. Cl.
USPC .......... 428/156; 428/141; 74/551.9; 473/599; 81/489

(58) Field of Classification Search .................. 428/156, 428/141; 16/421, 431–446, 430; 473/202–203, 473/288–303; 81/489; 74/551.1, 551.9, 74/557, 558; 15/143.1; 36/126–129, 67 A–67 D, 36/59 A–59 D
See application file for complete search history.

(56) References Cited

U.S. PATENT DOCUMENTS

| | | | |
|---|---|---|---|
| 1,690,557 | A | 11/1928 | Smith |
| 2,983,512 | A | 5/1961 | Fleischer |

(Continued)

FOREIGN PATENT DOCUMENTS

| | | | |
|---|---|---|---|
| DE | 29515667 | U1 | 12/1995 |
| DE | 10 2004 052 684 | A1 | 9/2005 |

(Continued)

OTHER PUBLICATIONS

International Search Report dated Jul. 7, 2010, 7 pages.
International Search Report dated Jun. 30, 2010, 7 pages.
U.S. Appl. No. 13/218,492, filed Aug. 26, 2011, Bernhard Sikora et al.

*Primary Examiner* — Maria Veronica Ewald
*Assistant Examiner* — Nathan Van Sell
(74) *Attorney, Agent, or Firm* — David K Mattheis; Kim W Zerby

(57) ABSTRACT

The present invention relates to a surface structure for a working device. In particular, the invention relates to a surface structure for a working device that has at least one first element with a first height and a second element with a second height, and a third element having a third height, wherein the second height is greater than the third height, having in addition a first grip area, a second grip area, and a third grip area, wherein the elements are arranged on a dot matrix, wherein the centers of the second elements and the centers of the third elements are arranged on the points of intersection and the centers of the first elements are not arranged on the points of intersection, and the first grip area comprises first elements and second elements, the second grip area comprises predominantly second elements, the third grip area comprises predominantly third elements. The present invention also relates to a working device having such a surface structure.

11 Claims, 6 Drawing Sheets

U.S. PATENT DOCUMENTS

| | | | | |
|---|---|---|---|---|
| 5,234,740 | A | 8/1993 | Reeves et al. | |
| 6,075,221 | A | 6/2000 | Minhas | |
| 6,108,870 | A | 8/2000 | Lo | |
| 7,044,020 | B2 | 5/2006 | Rosenthal | |
| 2003/0088946 | A1 | 5/2003 | Ferguson et al. | |
| 2005/0172492 | A1 | 8/2005 | Blaustein et al. | |
| 2007/0067960 | A1 | 3/2007 | Lee et al. | |
| 2008/0118709 | A1 | 5/2008 | Sims et al. | |
| 2008/0163500 | A1 | 7/2008 | Bozikis et al. | |
| 2009/0139108 | A1 | 6/2009 | Ricklefs et al. | |
| 2010/0248873 | A1 * | 9/2010 | Cooper ......................... | 473/599 |

FOREIGN PATENT DOCUMENTS

| | | | |
|---|---|---|---|
| EP | 1 127 529 | A1 | 8/2001 |
| EP | 1764191 | A2 | 3/2007 |
| GB | 2185209 | A | 7/1987 |
| WO | WO-2004018163 | A1 | 3/2004 |
| WO | WO-2007125222 | A1 | 11/2007 |

* cited by examiner

SURFACE STRUCTURE FOR A WORKING DEVICE

CROSS REFERENCE TO RELATED APPLICATIONS

This application is a continuation application of prior co-pending International Application No. PCT/IB2010/051240, filed Mar. 22, 2010, designating the United States.

SCOPE OF THE INVENTION

The present invention relates to a surface structure for a working device. This surface structure is intended to ensure a good gripping of the surface; in particular, the structure is suitable for use as the surface of a handle. The following may be considered "working devices" in the sense of the invention described and claimed herein: non-motor-driven and motor-driven devices, craftsmen's tools, household devices, including in particular motor-driven household devices (handheld blenders, hand mixers, immersion blenders), wet razors, electric shavers, hair care devices (hair dryers, curling irons, straightening irons), and devices for removing hair (in particular depilating devices). The invention also relates to a working device having such a surface structure.

BACKGROUND OF THE INVENTION

U.S. Pat. No. 1,690,557 discloses a wet razor having a metallic handle. This handle has the shape of a cylindrical rod, and has raised parts on its surface. Such raised parts can be produced by applying a pattern of parallel lines. The raised parts then have a diamond-shaped base, and appear as small pyramids. The pattern depicted is applied uniformly over the entire gripping surface. Such a pattern is primarily suitable for metallic surfaces. However, when the handle is wet the grip adhesion is not optimal. Because the raised parts all have the same height, the fingers do not have as much hold, in particular as soon as a finger slides off.

DE 10 2004 052 681 A1 discloses a handle that is intended to be suitable for a large number of devices. This handle has so-called acupressure features that are adapted to fit the inner surface of the hand. This handle is therefore intended to be held in a very particular position. If the device is held differently, it is difficult to grasp. In fact, when held differently this device provides an even less secure and comfortable grip than a smooth handle. The advantage of proposing a particular way of holding the handle is therefore achieved at the cost of poor suitability of the handle for other ways of holding it.

EP 1 127 529 A1 discloses a vacuum cleaner having a handle segment. This handle segment is produced by the combination of a harder plastic material and a softer, more graspable plastic material. The softer plastic material protrudes past the hard plastic surface in the form of knobs. The knobs therefore provide a degree of security to the grasping hand. However, in an electrically operated device, grasping comfort is greatest when the vibrations that almost unavoidably occur due to the electrical operation of the device are transferred to the hand only to a limited extent. The disclosed surface made of hard plastic, which is much larger than the surface of the knobs, will however probably result in a significant transmission of vibration.

Therefore, the present invention seeks to improve the prior art and to provide an improved surface structure for a working device. This surface structure is intended to enable a secure grip while allowing different holding positions, while nonetheless providing an optimal holding position. In addition, this surface structure is intended to transmit vibrations of the working device only to a limited extent.

DETAILED DESCRIPTION OF THE INVENTION

A surface structure having these advantages is the surface structure claimed in Claim 1. The surface structures in the subclaims offer specific advantages.

Thus, the surface structure has at least three elements, namely a first element, a second element, and a third element. Such elements may have any shape, as long as they can be distinguished from the surface structure. The elements may be recesses in the surface structure, but as a rule are raised parts. The elements have a base surface. To the extent that the elements are formed integrally with the surface structure, the base surface results from extrapolation of the surface in the vicinity of the elements. The elements also have at least one side surface. For example, an element may have the shape of a segment of a sphere. The element then has, in addition to the base surface, only one limiting surface. This surface on the sphere surface is designated here as a side surface. However, the element can also be pyramid-shaped. It then has, for example, four side surfaces.

The elements have a certain height. This height is measured from the highest point of the element to the base surface. (For elements that represent recesses, the lowest point below the surface would correspondingly be used, but the value obtained should however also be referred to as the height.)

In addition, the surface structure has different grip areas. These grip areas may be adjacent to one another or arranged at a distance from one another.

Furthermore, according to the invention, the elements are aligned on a dot matrix. Such a dot matrix may for example be determined by the points of intersection of two sets of parallel lines. In this case, four adjacent points enclose a diamond. If the sets of parallel lines are situated perpendicular to one another, four adjacent points enclose a rectangle or square. It is also possible to produce a dot matrix using curved lines.

According to the invention, the centers of the second elements and the centers of the third elements are now arranged on the points of the dot matrix. The center of an element is understood to be the center of gravity of the element, given homogenous mass of the element. Here, the element is considered limited by a base surface that may in turn result from extrapolation of the surface in the vicinity of the element.

Differing from the centers of the remaining elements, the centers of the first elements are not arranged on the dot matrix. The centers of the first elements can be arranged on the connecting lines between points of the dot matrix.

According to the invention, the first grip area contains first elements and second elements, wherein the second grip area predominantly contains second elements and the third grip area predominately contains third elements.

In a development of the invention according to Claim 2, the dot matrix is produced by parallel lines. This results in a dot matrix that is easy to define, promoting easy realization of the present invention, and also offering cost advantages with regard to machine-based implementation of the invention. Moreover, such a dot matrix can define grip areas in a particularly easily visible manner, thus promoting intuitive grasping in an ergonomically advantageous manner.

According to the development of the invention according to Claim 3, the second grip area contains three times as many second elements as first elements. In this way, the second grip area is set off particularly clearly from the first grip area. In particular because they produce stronger friction with the hand, the first elements in the first grip area can allow a particularly secure grip. However, here there is also an increased transmission of vibration. Therefore, it can be advantageous to keep the number of first elements in the second grip area low, or to provide no first elements at all in the second grip area.

In a development of the invention according to Claim 4, the third elements are mathematically similar to the second elements; i.e., the third elements are essentially miniaturizations of the second elements. Through the selection of similar elements, a particularly smooth transition can be provided between the second and third grip areas. Thus, even given a non-ideal holding of the handle, a secure and comfortable grasping is possible.

The development of the invention according to Claim 5 provides that the height of the second elements in the second grip area decreases continuously as the distance from the first grip area becomes greater. The continuous decrease in height in turn allows a particularly smooth transition of the grip area, and thus provides a certain degree of tolerance with regard to ways of holding the handle that are not completely ideal. Especially when a working device is grasped quickly, the hand will not always immediately find the ideal holding position.

The development of the invention according to Claim 6 provides that the height of the first elements (h1) is less than the height of the second elements (h2). According to this development, there is a particularly advantageous transition between the second grip area and the first grip area. The highest elements in the first grip area are then also elements having the height h2. The maximum height in the first grip area and in the second grip area will then also equally be determined by the second elements. However, a firmly grasped hand will also contact the first elements. Therefore, even if height h1 is lower than height h2, the first grip area will be the most likely to offer a particularly secure grasp.

The development of the invention according to Claim 7 provides that the height (h1) of the first elements is in turn greater than the height (h3) of the third elements. In other words, therefore, the height (h3) of the third elements is lower than the height (h1) of the first elements, and, according to the invention, is also lower than the height (h2) of the second elements. Therefore, these third elements act more as auxiliary elements helping to avoid excess slipperiness of the surface. Intuitively, however, the user of the surface structure will not grasp the handle in the area of the third elements if their height is particularly low.

According to the development of the invention according to Claim 8, the height of the third elements in the third grip area decreases continuously as the distance from the first grip area increases. In this way, an aesthetically pleasing surface can be produced that, however, in order to increase operating safety, does not provide grasping only or predominantly in the third grip area.

According to a development of the invention according to Claim 9, the angle of the first and/or second and/or third elements between the respective base surface of the elements and at least one side surface of the elements is less than 45°. Preferably, this condition is fulfilled by that angle between the base surface and the side surface of the elements that is measured furthest from the center of the first grip area. According to the invention, the corresponding angle may also be smaller than 30° or smaller than 20° or smaller than 10°. Preferably, this condition is also met by that angle between the base surface and side surface of the elements, the angle between the base surface and that side surface is measured that is situated farthest from the apex of the curve. According to the invention, the corresponding angle may also be smaller than 30° or smaller than 20° or smaller than 10°.

According to a development of the invention according to Claim 10, it is also possible to use elements that, in a top view of the surface, are essentially semicircular in shape, or that are arranged symmetrically around a circular segment or a semicircle. Such elements have proven to be easy to grasp, and offer a high degree of grip security.

According to a development of the invention according to Claim 11, the first elements are selected such that they are symmetrical to their longitudinal axis. This again results in elements that have a secure grip and that are aesthetically pleasing.

DESCRIPTION OF THE FIGURES

FIG. 1 shows a surface suitable for the arrangement of first elements (11), second elements (12), and third elements (13) in a first grip area (21), a second grip area (22), and a third grip area (23) (these elements not already being shown in the Figure). For the arrangement of these elements in the various grip areas, first a dot matrix is to be provided on the surface. This dot matrix can be produced through sets of parallel lines. Depicted is a first set 31 of parallel lines and a second set 32 of parallel lines. The respective lines from the first and second set are perpendicular to one another and are equidistant from one another. In this way, a dot matrix is produced in which each four points enclose a square. The depicted surface has a direction W along which it is curved and a direction F in which it is flat.

FIG. 2 shows the dot matrix 34, which was obtained using the parallel lines from FIG. 1, without again showing these lines.

FIG. 3 shows a surface structure 10 according to the invention. This surface structure is arranged on the surface known from FIGS. 1 and 2, which is curved along the direction W and runs flat along the direction F. In the center of the depicted segment there a first grip area 21 is arranged. Adjacent thereto is a second grip area 22, and adjacent thereto in turn is a third grip area 23.

Figure 1:
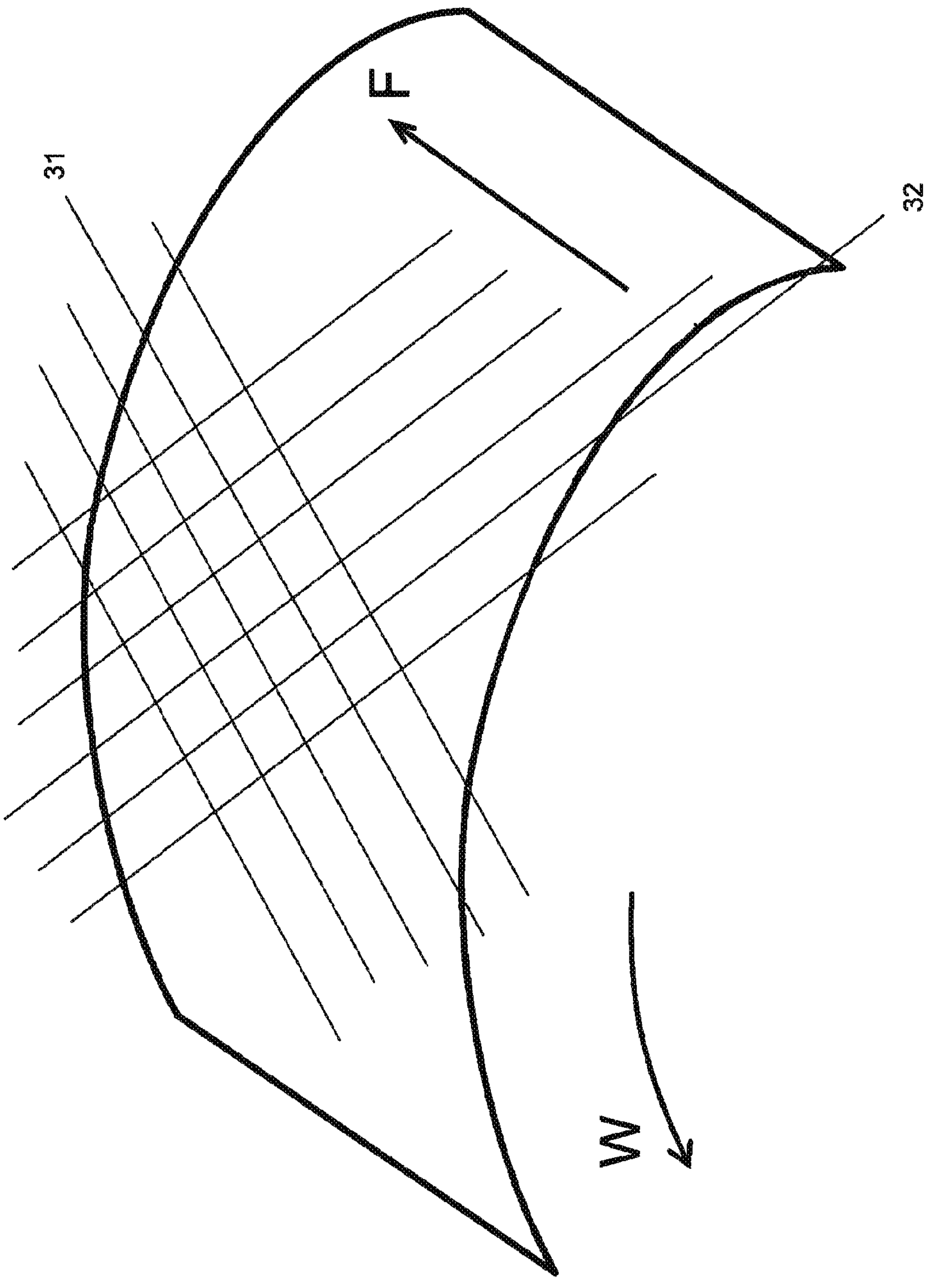
FIG. 1 shows a three-dimensional top view of a surface that, however, does not have all the features of a surface structure according to the invention.
Figure 2:
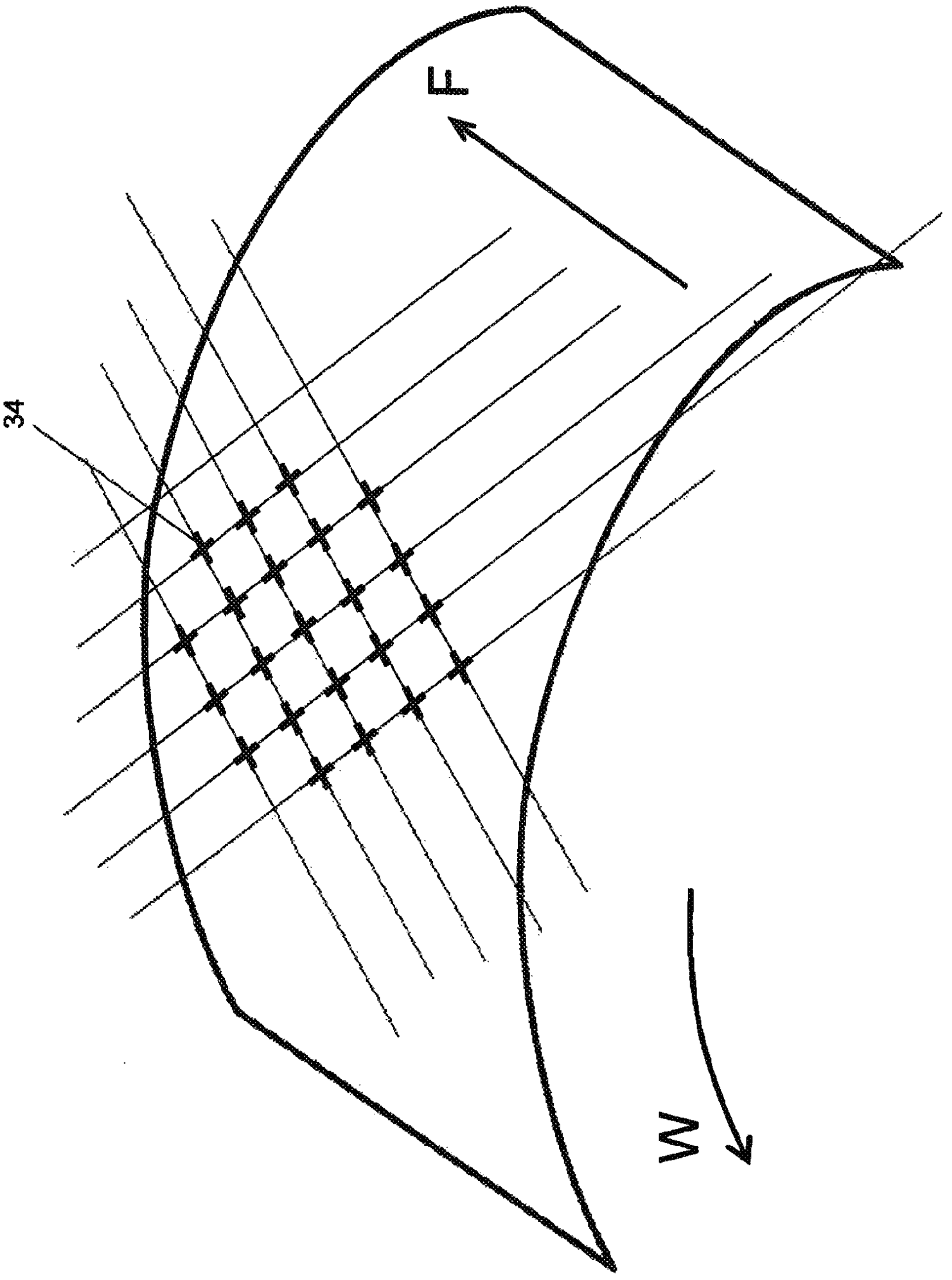
FIG. 2 shows a view of the type shown in FIG. 1, which also does not have all the features of a surface structure according to the invention, in which in particular the dot matrix is shown.

First grip area 21 contains a number of first elements 11 in the form of pyramids on a quadratic base surface. The center of the base surface is situated in each case on a point of the dot matrix. In first grip area 21, first elements 11 are arranged along the connecting lines between each two points of the dot matrix. The first elements 11 are shorter in height than the second elements 12. The first elements 11 are symmetrical about their longitudinal axis, and this longitudinal axis is oriented such that in each case it connects two points of the dot matrix.

The second grip area 22 contains only second elements 12, and does not contain any first elements 11. The depicted second elements 12 are identical in shape to the second elements 12 in the first grip area 21.

The third grip area 23 contains third elements 13. These elements are also pyramid-shaped. Like the second elements 12, the third elements 13 are pyramids on a quadratic base surface. Here, the third elements 13 are similar, even in the mathematical sense, to elements 12, so that they are miniaturizations of the second elements 13.

Figure 3:
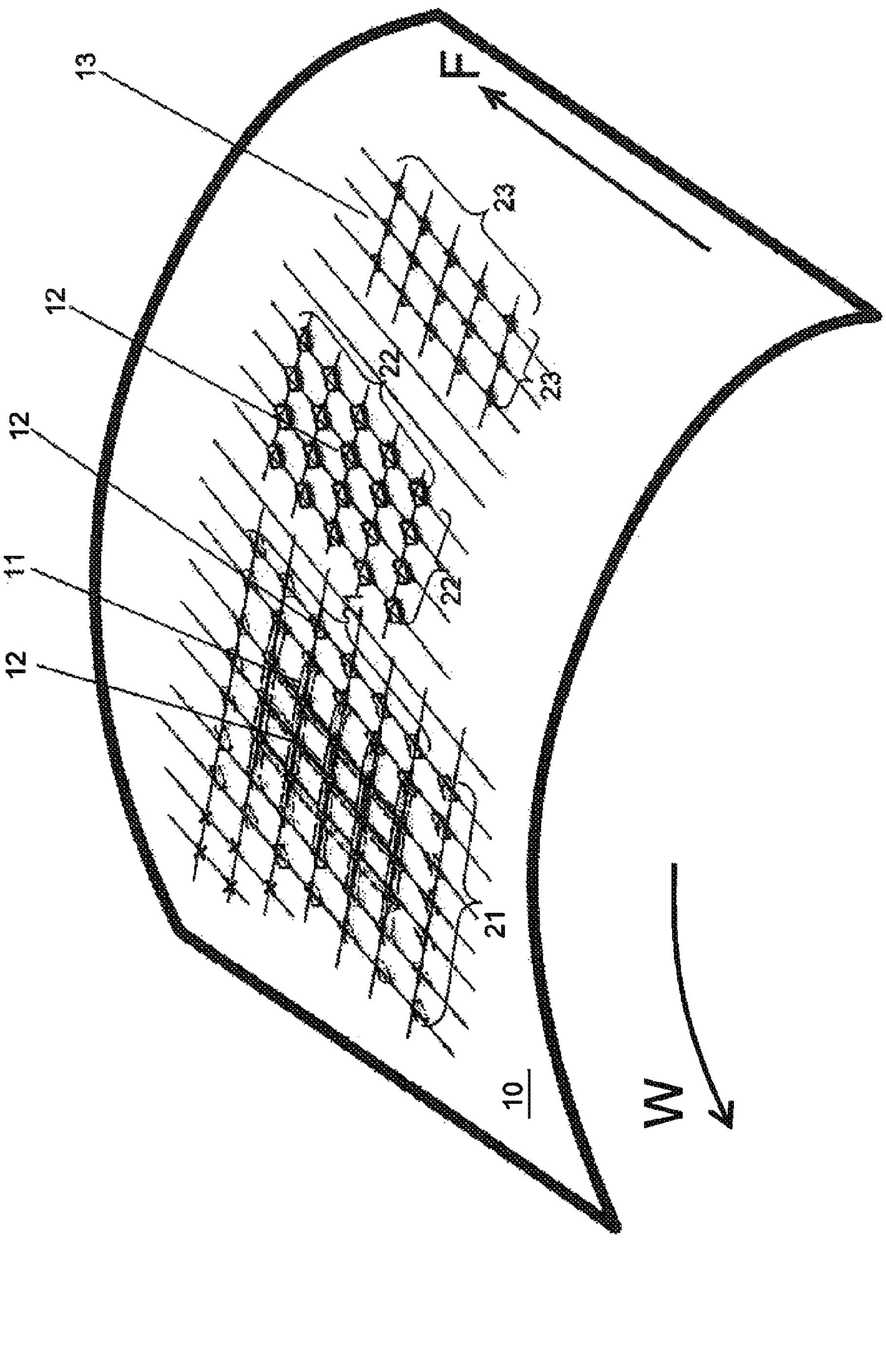
FIG. 3 shows a three-dimensional top view of a surface structure according to the invention.
Figure 4:
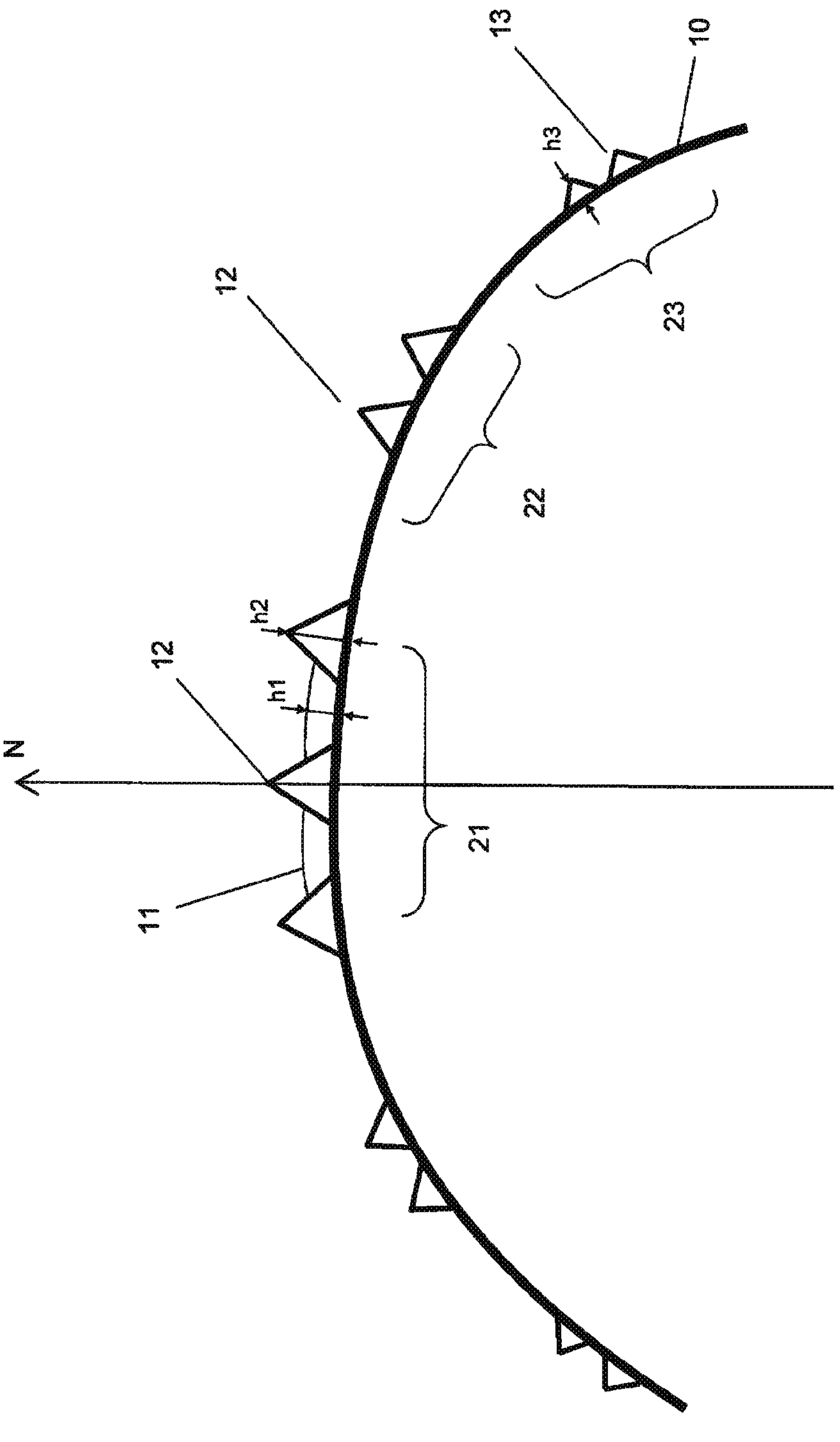
FIG. 4 shows a cross-section through the structure shown in FIG. 3.

FIG. 4 shows a cross-section through FIG. 3. The surface normal N runs through the center of the first grip area 21. There, first elements 11 having the height h1 are arranged, as are second elements 12 having the height h2. The height h2 is greater than height h1. In the adjacent second grip area 22, only second elements 12 are provided. They have the same height h2 as do the second elements in first grip area 21. In the adjacent third grip area 23, third elements 13 are provided having the height h3. The height h3 is less than height h2.

In the depicted embodiment, the height h2 is constant in the entire second grip area, and the height h3 is constant in the entire third grip area. A continuous decrease in the heights is also conceivable. Here, the height of the second elements can continuously decrease already within the first grip area 21, and this decrease can continue in the second grip area 22. The height of the second elements can also continuously decrease in the direction of the transition to the third grip area 23 in such a way that at the transition between the two grip areas, the third elements 13 have the same height as the adjacent second elements.

Figure 5:
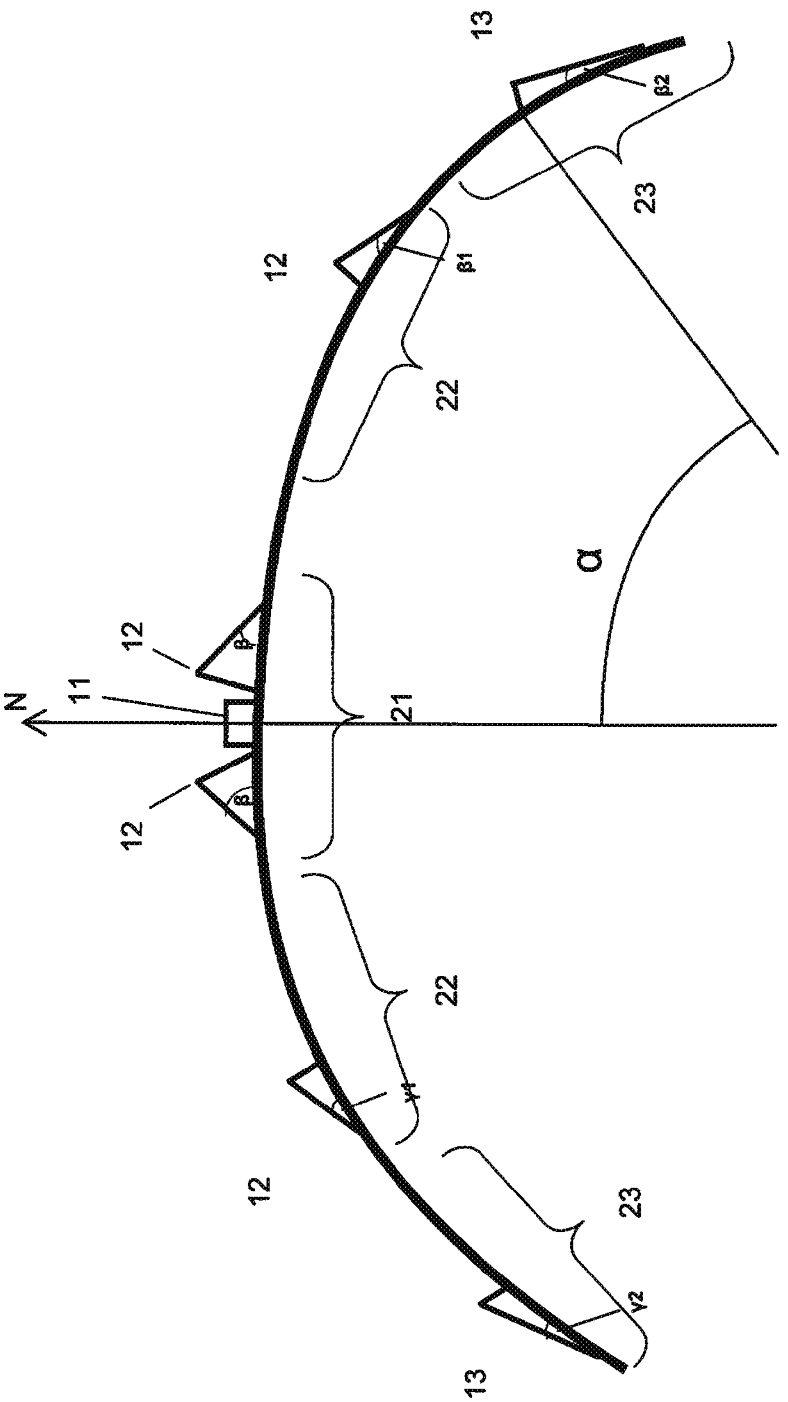
FIG. 5 shows a cross-section of an alternative surface structure according to the invention.

FIG. 5 shows a view of the type shown in FIG. 4, in which another embodiment of the invention is shown. First elements 11 and second elements 12 are arranged in the first grip area 21. These second elements have an angle β between the base surface and the side surface. The angle β is measured in each case at the side surface that is oriented away from the center of the first grip area. The second elements 12 are also shown in the second grip area 22. In these elements, the corresponding angle (β1) is smaller than in the first grip area. In addition, third elements 13 are shown in the third grip area. In these elements, the corresponding angle (β2) is in turn smaller than in the second grip area. The size of angle β thus decreases as the distance increases from the apex of the angle to the center of the first grip area. This distance can be measured by angle α. In the context of the present invention, it can be advantageous for the angle β to decrease by the amount of the corresponding angle α as the distance from the apex increases.

Figure 6:
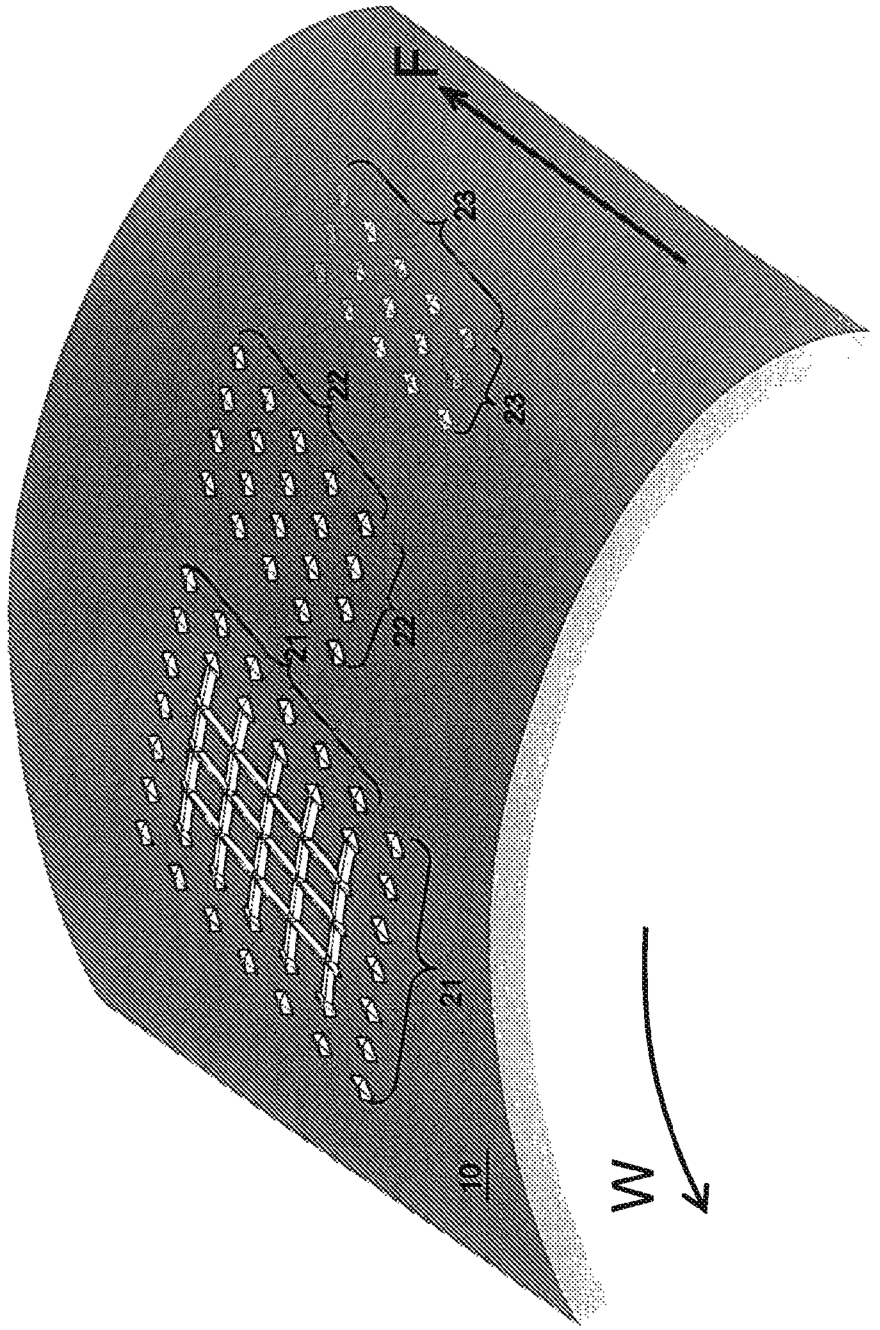
FIG. 6 shows a perspective top view providing a good view of the appearance of the invention.

FIG. 6 shows a perspective view of a segment of a surface structure according to the invention. In this segment, it can be seen that an area 21 is particularly suitable as a grip area. This could, for example, act as a thumb support. The thumb would then exert a higher pressure on this area than would other parts of the hand. These parts of the hand, however, are situated in areas 22 and 23, and make the grip more secure. In the parts of the surface further removed from grip center 21, the connection between the working device and the grasping hand is however not as secure. This has the advantage that vibrations are transmitted less intensively. The depicted grip pattern is intuitive insofar as the thumb will generally always be placed on area 21 in order to exert high pressure there. On the other hand, it is also possible to apply another finger or another area of the hand to area 21, so that the surface structure permits a large number of gripping positions.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A surface structure for a working device, having at least one first element with a first height and having a plurality of second elements with a second height, a plurality of third elements with a third height, wherein the second height is greater than the third height, and in addition having a first grip area, a second grip area, and a third grip area, wherein the elements are arranged on a dot matrix, and wherein the centers of the second elements and the centers of the third elements are arranged on the points of intersection, and the center of the first element is not arranged on the points of intersection, and the first grip area comprises a first element and second elements, the second grip area comprises predominantly second elements, and the third grip area comprises predominantly third elements wherein said structure is produced by the points of intersection of a first set of parallel lines and a second set of parallel lines.

2. The surface structure according to claim 1, in which more than three times as many second elements as first elements are arranged in the second grip area.

3. The surface structure according to claim 1, in which the third elements are mathematically similar to the second elements.

4. The surface structure according to claim 1, in which the height of the second elements in the second grip area decreases continuously as the distance from the first grip area becomes greater.

5. The surface structure according to claim 1, in which the height of the first elements is greater than the height of the third elements.

6. The surface structure according to claim 1, in which the height of the third elements in the third grip area continuously decreases as the distance from the first grip area becomes greater.

7. The surface structure according to claim 1, in which the second elements are semicircular in shape.

8. The surface structure according to claim 1, in which the first elements are symmetrical to their longitudinal axis.

9. A working device having a surface structure according to claim 1 on at least one of its external surfaces.

10. A surface structure for a working device, having at least one first element with a first height and having a plurality of second elements with a second height, a plurality of third elements with a third height, wherein the second height is greater than the third height, and in addition having a first grip area, a second grip area, and a third grip area, wherein the elements are arranged on a dot matrix, and wherein the centers of the second elements and the centers of the third elements are arranged on the points of intersection, and the center of the first element is not arranged on the points of intersection, and the first grip area comprises a first element and second elements, the second grip area comprises predominantly second elements, and the third grip area comprises predominantly third elements, in which the height of the first elements is less than the height of the second elements.

11. A surface structure for a working device, having at least one first element with a first height and having a plurality of second elements with a second height, a plurality of third elements with a third height, wherein the second height is greater than the third height, and in addition having a first grip area, a second grip area, and a third grip area, wherein the elements are arranged on a dot matrix, and wherein the centers of the second elements and the centers of the third elements are arranged on the points of intersection, and the center of the first element is not arranged on the points of intersection, and the first grip area comprises a first element and second elements, the second grip area comprises predominantly second elements, and the third grip area comprises predominantly third elements, in which at least one side surface of the second element and/or a side surface of the third elements form an angle of less than about 45° with the associated base surface.

* * * * *